United States Patent
Bay et al.

(10) Patent No.: US 9,830,326 B2
(45) Date of Patent: Nov. 28, 2017

(54) IDENTIFYING DATA OFFSETS USING BINARY MASKS

(71) Applicant: CA, Inc., New York, NY (US)

(72) Inventors: John William Bay, Warrenville, IL (US); Jeffrey Michael Allman, Dyer, IN (US); Thomas Paul Cicero, Buffalo Grove, IL (US); Syed Fouad Hussain, Bartlett, IL (US); Patrick Nicholas Medved, Plainfield, IL (US)

(73) Assignee: CA, Inc., New York, NY (US)

( * ) Notice: Subject to any disclaimer, the term of this patent is extended or adjusted under 35 U.S.C. 154(b) by 296 days.

(21) Appl. No.: 14/740,037

(22) Filed: Jun. 15, 2015

(65) Prior Publication Data
US 2016/0364474 A1  Dec. 15, 2016

(51) Int. Cl.
G06F 17/30 (2006.01)

(52) U.S. Cl.
CPC ............... *G06F 17/30106* (2013.01)

(58) Field of Classification Search
USPC ......................................................... 707/769
See application file for complete search history.

(56) References Cited

U.S. PATENT DOCUMENTS

| 6,052,683 | A | * | 4/2000 | Irwin | H04L 45/7457 707/758 |
|---|---|---|---|---|---|
| 6,141,738 | A | * | 10/2000 | Munter | H04L 29/12009 370/389 |
| 9,201,629 | B2 | * | 12/2015 | Greiner | G06F 9/3001 |
| 2002/0010793 | A1 | * | 1/2002 | Noll | H04L 49/90 709/240 |
| 2003/0200244 | A1 | * | 10/2003 | Abraham | G06F 11/263 708/495 |
| 2006/0136875 | A1 | * | 6/2006 | Thorpe | G06F 21/16 717/122 |

* cited by examiner

*Primary Examiner* — Cam-Linh Nguyen
(74) *Attorney, Agent, or Firm* — Gilliam IP PLLC (57) ABSTRACT

To analyze data fields in an unstructured data set or a data set where the structure is unknown, masks can be constructed and used to determine locations of the individual fields within each data set entry. The locations can be indicated as offsets within a data set entry. An offset indicates where a data field begins. A set of masks can be constructed for at least some of the entries in a data set (e.g., a file). The masks can include a mask for padding (e.g., spaces, tabs, zeroes, etc.), and each expected type of data (e.g., alphabetic character, numeric character, and symbol). Each type of mask can be aggregated across data set entries and then analyzed to identify individual field locations. With the information about field locations, the data set can be analyzed.

20 Claims, 8 Drawing Sheets

IDENTIFYING DATA OFFSETS USING BINARY MASKS

BACKGROUND

The disclosure generally relates to the field of computer systems, and, more particularly to identifying data field locations in a data set.

Electronic data may be stored and organized in accordance with a predetermined structure or scheme. For example, data may be stored in a table where each row includes five data fields of varying byte lengths. Data can be read from the table rows if the locations or offsets of the data fields within the row are known. Information about data field locations and offsets may be stored along with an associated data set or contained in another location; however, this information, especially in legacy systems, may be missing or unknown.

SUMMARY

To analyze data fields in an unstructured data set or a data set where the structure is unknown, masks can be constructed and used to determine locations of the individual fields within each data set entry. The locations can be indicated as offsets within a data set entry. An offset indicates where a data field begins. A set of masks can be constructed for at least some of the entries in a data set (e.g., a file). The masks can include a mask for padding (e.g., spaces, tabs, zeroes, etc.), and each expected type of data (e.g., alphabetic character, numeric character, and symbol). Each type of mask can be aggregated across data set entries and then analyzed to identify individual field locations. With the information about field locations, the data set can be analyzed.

This summary is a brief summary for the disclosure, and not a comprehensive summary. The purpose of this brief summary is to provide a compact explanation as a preview to the disclosure. This brief summary does not capture the entire disclosure or all embodiments, and should not be used limit claim scope.

BRIEF DESCRIPTION OF THE DRAWINGS

Embodiments of the disclosure may be better understood by referencing the accompanying drawings.

DESCRIPTION OF EMBODIMENT(S)

The description that follows includes example systems, methods, techniques, and program flows that embody embodiments of the disclosure. However, it is understood that this disclosure may be practiced without these specific details. For instance, this disclosure refers to using padding, alphabetic, numeric, and symbolic masks in illustrative examples. But aspects of this disclosure can be applied to other mask types, such as an alphanumeric mask or a mask for a specific character. In other instances, well-known instruction instances, protocols, structures and techniques have not been shown in detail in order not to obfuscate the description.

Overview

In a data set with multiple entries (e.g., records or rows), each entry can be unstructured in various scenarios (e.g., data formatted to save space), or the structure of the data set may be unknown. Without knowing the structure, individual fields of a data entry cannot be ascertained. To analyze the data in individual fields, masks can be constructed and used to determine locations of the individual fields within each data set entry. The locations can be indicated as offsets within a data set entry. An offset indicates where a data field begins. For example, a first data field may be ten bytes long and contain a first name, and a second data field may be fifteen bytes long and contain a last name. The offsets for the data fields would be zero and eleven, i.e. the first data field begins at byte 0 and ends at the tenth byte and the second data field begins at byte 11 and ends at byte 26. A set of masks can be constructed for at least some of the entries in a data set (e.g., a file). The masks can include a mask for padding (e.g., spaces, tabs, zeroes, etc.), and each expected type of data (e.g., alphabetic character, numeric character, and symbol). Each type of mask can be aggregated across data set entries and then analyzed to identify individual field locations. With the information about field locations, the data set can be analyzed.

Example Illustrations

Figure 1:
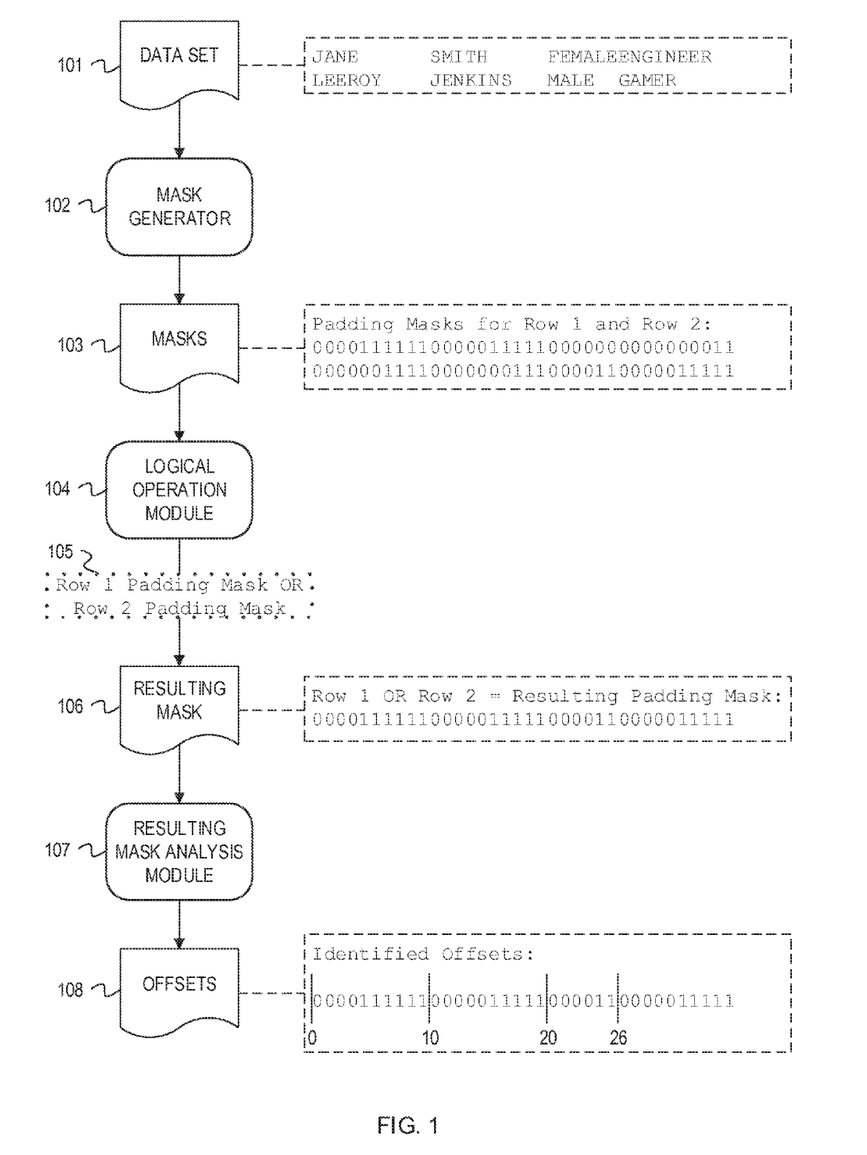
FIG. 1 is a conceptual diagram depicting a system that constructs and analyzes masks to locate data fields in an unstructured data set.

FIG. 1 is a conceptual diagram depicting a system that constructs and analyzes masks to locate data fields in an unstructured data set. FIG. 1 depicts a system that includes a mask generator 102, a logical operation module 104, and a resulting mask analysis module 107. The mask generator 102 receives a data set 101 and outputs masks 103. The masks 103 are input to the logical operation module 104. The logical operation module 104 performs example logical operation 105 and outputs resulting mask 106. The resulting mask 106 is sent to the resulting mask analysis module 107, which outputs offsets 108 after performing analysis on the resulting mask 106.

Data set 101 may be any set of data; however, for purposes of describing FIG. 1, data set 101 is a data set consisting of records or rows with data fields. For example, data set 101 may be data stored on a mainframe consisting of rows of customer information, wherein each row contains data for a single customer. Data set 101 is depicted in FIG. 1 as being divided into two rows or records. However, when stored in memory, the data set 101 may be in contiguous memory locations where row divisions are not readily discernible. The ending of a row of data may be determined by identifying a delimiter (e.g., a new line character or carriage return character) in the data set 101. The ending of a row of data may also be determined based on a known length of a row in the data set 101. In some instances, the length of a row in the data set 101 is known or indicated in a header or separate message. Although data set 101 is divisible into rows, the structure of the individual rows (e.g., the data fields in each row) is unknown. Particularly, the length, data type, and location of each data field are unknown. Additionally, the data fields are not delimited.

Mask generator 102 receives the data set 101 and constructs masks 103. The masks 103 are bit representations of the content in a row of data. Each bit of a mask corresponds to a data element (hereinafter "token") in a row (e.g., a byte) depending on the encoding of the data set. Masks 103 may include different types of masks such as a padding mask, an alphabetic mask, a numeric mask, and a symbolic mask. For simplicity, FIG. 1 depicts the masks 103 as including a padding mask for each the first and second rows of data contained in the data set 101. A padding mask indicates, in this illustration with a 1, wherever a padding token (e.g., a white space) occurs in a row of data. To create the padding masks in this example, the mask generator 102 reads each byte in the first and second rows of the data set 101 and inserts a 1 into the padding masks for each location of a padding token in the rows of data. For the first row of the data set 101, the padding mask for the data fields ("JANE SMITH") is 00001111110000011111. The padding mask contains a 1 for each byte location that is a padding token, and a 0 for each byte location that is not a padding token. Different mask types can be used to indicate the locations of other tokens in a row of data. For example, an alphabetic mask indicates wherever an alphabetic token occurs in a row of data. A symbolic mask indicates wherever a symbolic token occurs. And, a numeric mask indicates wherever a numeric token occurs.

Logical operation module 104 receives the masks 103 from the mask generator 102. The logical operation module 104 aggregates the masks 103 from across the rows using a logical operation and creates the resulting mask 106. The logical operation module 104 can construct the resulting mask 106 with one or more operations including OR, AND, or XOR. For example, the logical operation module 104 may apply the example logical operation 105 of "Row 1 Padding Mask OR Row 2 Padding Mask." The example logical operation 105 causes each bit of the padding mask from the first row to be logically OR'd with each corresponding bit of the padding mask from the second row. For example, as depicted in FIG. 1, the fifth bit of the first row padding mask in the masks 103 contains a 1 and the fifth bit of the second row padding mask contains a 0. OR'ing the fifth bits together causes a 1 to be placed in the fifth bit location of the resulting mask 106, i.e. 1 OR 0=1. Applying the example logical operation 105 to all bits across the rows creates the single aggregated padding mask (i.e., the resulting mask 106).

Resulting mask analysis module 107 ("analysis module 107") receives the resulting mask 106 from the logical operation module 105. The analysis module 107 identifies patterns in the resulting mask 106 that indicate a data field offset and generates the offsets 108. For illustration purposes, the offsets 108 are visually represented by offset illustration 109, which uses vertical lines to indicate the identified boundaries of data fields. As indicated by the vertical lines in the offset illustration 109, the analysis module 107 has identified each point in the resulting padding mask of the resulting mask 106 where a 1 changes to a 0. These are transition points in a row where a padding token or padding tokens transition to a non-padding token. With these transitions, transitions in data fields can be inferred. The offsets 108 for the data fields of data set 101 include offset values 0, 10, 20, and 26, i.e. the beginning of the row and each location in the resulting padding mask where a 1 changes to a 0. As described in more detail below in FIG. 2, different patterns may indicate offsets depending on the mask type. For example, when analyzing an alphabetic mask, the analysis module 107 may identify each point where a 0 transitions to a 1 to infer the beginning of a new data field. After identifying the patterns that indicate offsets, the analysis module 107 outputs the offsets 108.

The offsets 108 may be supplied to another entity (e.g., a data analysis module). A data analysis module can read data fields from the data set 101 as described by the offsets 108. For example, the offsets 108 for the third and fourth data fields in the data set 101 are 20 and 26. Using the offsets 108, bytes 20-25 of the first row can be extracted to read the data field with "FEMALE." Without knowing the offsets 108, a data analysis may not be able to ascertain the "FEMALE" since no delimiter exists between that field and the data field "ENGINEER."

The offsets 108 may also be stored in a file for future use by another entity. The file may contain a memory address for the beginning of each data field or the file may contain a template or data structure that describes the structure of the file. Additionally, the offsets may be indicated as integers that can be used in an array. As illustrated in FIG. 1, data set 101 has offsets of 0, 10, 20, and 26. Those offsets may be used to read from an array formed with the row of data. For example, if an array datarow 1 contains the data stored in the first row of the data set 101, the second data field may be accessed by reading from datarow 1[10] to datarow 1[19].

FIG. 1 depicts the example logical operation 105 being applied to padding masks from two rows of data. In some embodiments, the logical operation module 104 may apply a logical operation to aggregate more than two rows. For example, padding masks from one hundred rows may be OR'd together to create a single resulting padding mask. In some embodiments, masks from all rows of data may be analyzed to determine data field locations. In other embodiments, masks from a subset of rows may be analyzed. In such embodiments, the determined offsets may be applied to the remaining unanalyzed data rows in order to ascertain the location of the data fields.

Although the masks can be used to identify offsets with a high degree of accuracy, the data field locations are inferred with the masks. Without knowing the original structure, a system uses the masks to determine the likely or inferred locations of data fields. However, confidence of the identified data field locations can improve with the number of data rows used to construct the masks. A system can be configured to analyze a minimum number of rows to construct masks and determine field locations with the masks before applying determined field locations to an entire data set. Additionally, a system can be configured to continue construction and aggregation of masks for rows until identified likely locations of data fields stabilize. For example, after analyzing three rows of data, a system may determine offsets for a data set to be at 0, 9, and 15 bytes. However, after analyzing a fourth row, a system may determine offsets for the data set to be at 0, 10, and 16. The change in determined offsets would cause the system to continue constructing and aggregating masks for additional rows until the offsets remained consistent for a threshold number of rows. Offset stabilization is described in more detail in FIG. 6.

Figure 2:
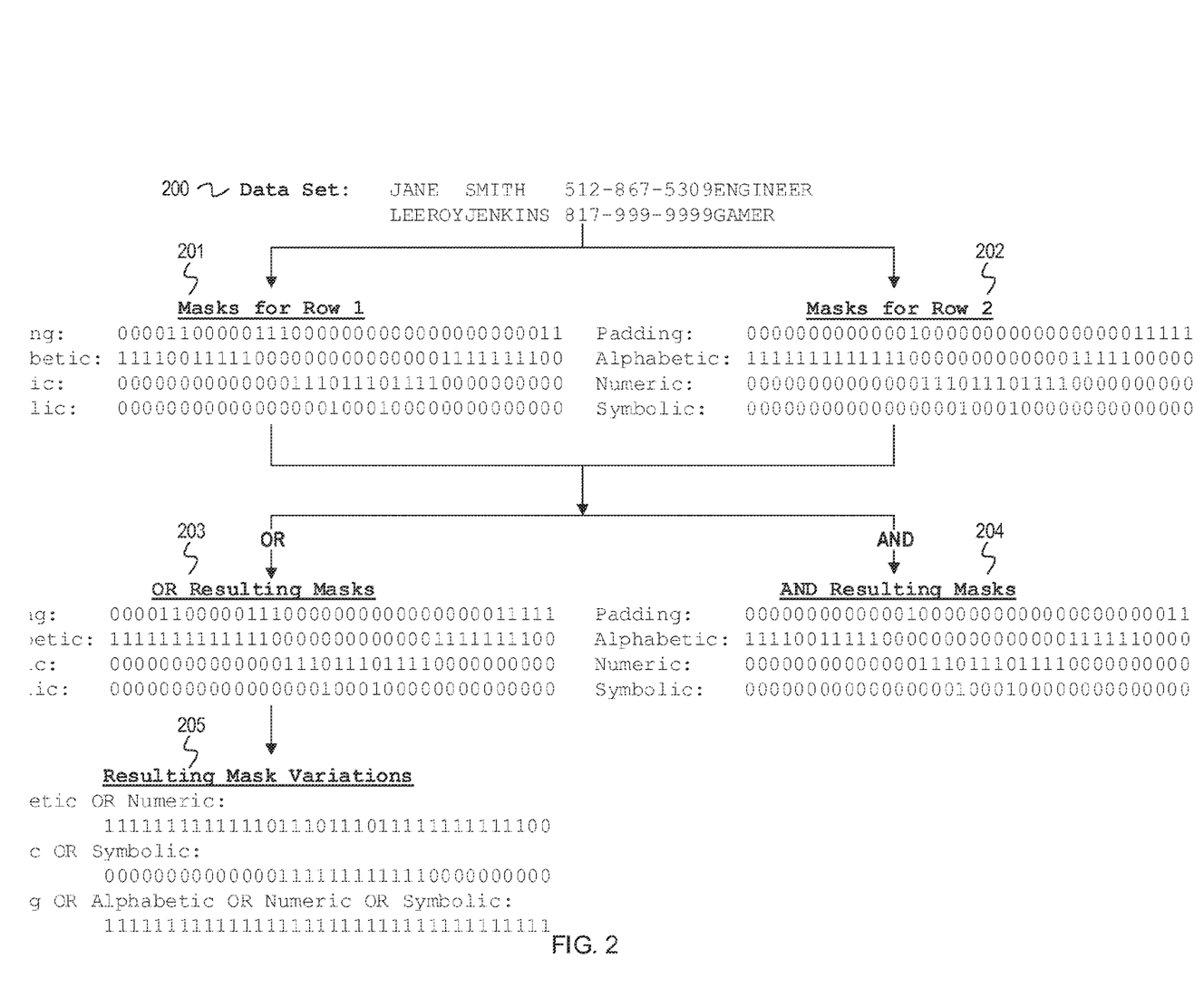
FIG. 2 depicts a sample data set and masks constructed using the data set.

FIG. 2 depicts a sample data set and masks constructed using the data set. FIG. 1 depicted an example data set limited to alphabetic tokens for ease of explanation. FIG. 2 uses an example data set that includes alphabetic, numeric, and symbolic tokens to illustrate the other types of masks that can be constructed and applied. FIG. 2 depicts data set 200, row 1 masks 201, row 2 masks 202, OR resulting masks 203, AND resulting masks 204, and resulting mask variations 205.

Data set 200 contains rows of unstructured data. As illustrated in FIG. 2, the data set 200 is divided into two rows with four data fields each. The data fields include a first name, a last name, a phone number, and an occupation.

The row 1 and row 2 masks 201 and 202 each include four mask types: padding, alphabetic, numeric, and symbolic. Each mask type includes a 1 for each location in the data set 200 where a corresponding token occurs. For example, the alphabetic masks include a 1 for each alphabetic token occurrence. The row 1 masks 201 were constructed by determining the type of each token in the first row of the data set 200. For each token location, a 1 was added to the mask corresponding to the type of token, and a 0 was added to all other masks for the token location. For example, the alphabetic token "J" at the first token location of the first row of the data set 200 caused a 1 to be placed in the alphabetic mask and a 0 in all other masks for the first token location of the row 1 masks 201. The row 2 masks 202 were similarly constructed using the second row of the data set 200. The mask construction process is described in more detail in the FIG. 5 flow diagram.

Logical operations are performed on the row 1 masks 201 and the row 2 masks 202 to create the OR resulting masks 203 and the AND resulting masks 204. As described in FIG. 1, resulting masks are created by applying a logical operation to masks across rows of data to aggregate the masks of each mask type into a single mask. The OR resulting masks 203 were aggregated by OR'ing together the corresponding mask types from the row 1 masks 201 and the row 2 masks 202. For example, the padding mask of the OR resulting masks 203 was created by OR'ing each bit of the padding mask of the row 1 masks 201 with each corresponding bit of the padding mask of the of the row 2 masks 202. Likewise, the AND resulting masks 204 were aggregated by AND'ing together the corresponding mask types from the row 1 masks 201 and the row 2 masks 202.

The OR resulting masks 203 and the AND resulting masks 204 may be analyzed to determine inferred structure (i.e., determine inferred locations of data fields) for the data set 200. The location of data fields (i.e., offsets) are determined by identifying patterns in the resulting masks. Different patterns may be identified depending on the resulting mask type or logical operation applied to aggregate the resulting mask. For example, the offsets for the first name, last name, and phone number data fields can be determined by identifying a 1 to 0 pattern in the padding mask of the OR resulting masks 203. Conversely, the offsets for the first name and last name data fields can also be determined by identifying a 0 to 1 pattern in the alphabetic mask of the OR resulting masks 203 or the AND resulting masks 204.

Additionally, offsets may be identified by searching for patterns associated with commonly occurring data. For example, credit card numbers are commonly stored data and are known to be sixteen numbers long. If the numeric mask of the OR resulting masks 203 or the AND resulting masks 204 indicates sixteen consecutive numbers, it can be assumed that the offset for a data field occurs where the numeric mask changes from a 0 to a 1 and that another offset occurs sixteen bytes later. As another example, a phone number is known to contain ten numbers and may be stored in a limited number of formats that typically include a three number grouping followed by another three number grouping and a four number grouping. As depicted in FIG. 2, the phone number data field includes ten numbers and two dashes. When analyzing the numeric mask, it may appear that there are three separate data fields, a first and second each containing three numbers and a third containing four numbers. However, by identifying a phone number pattern, it can be determined that, what appears as three data fields, is actually a single data field containing a phone number. A similar technique may be used to identify social security numbers, which take the pattern of a three number grouping followed by a two number and then a four number grouping. Furthermore, patterns may be identified by analyzing the numeric and the symbolic masks of the OR resulting masks 203 in conjunction. In the phone number example, the symbolic mask of the OR resulting masks 203 indicates the common storage format of a phone number that includes two dashes or symbols between the number groupings. Additionally, the padding mask of the OR resulting masks 203 may be used in conjunction with the numeric and symbolic masks in the event a phone number is stored in a format that includes a space, such as (512) 555-5555. A resulting mask analysis module can use pre-defined patterns for these various expected types of data to identify the data fields. In addition, patterns for particular types of data fields can be learned as more data sets are processed.

The resulting mask variations 205 can also be analyzed to identify offsets. The resulting mask variations 205 are masks that were created by applying a logical operation to two OR resulting masks 203 of different mask types. Although not depicted, resulting mask variations can also be created from the AND resulting masks 203. As depicted in FIG. 2, one of the resulting mask variations 205 was created by OR'ing the numeric and symbolic resulting masks of the OR resulting masks 203. The numeric and symbolic resulting mask variation can be analyzed to determine the length of the phone number data field, i.e. the points in the mask where the bits transitions from a 0 to a 1 and subsequently a 1 to a 0. Another mask of the resulting mask variations 205 was created by OR'ing the alphabetic and numeric masks of the resulting mask variations 203. Such a mask may be useful in identifying offsets for a data field that includes a mix of alphabetic and numeric tokens, such as a password. Additionally, resulting mask variations 205 may be created by applying a logical operation to aggregate more than two resulting masks.

Often, more than a single mask type will be analyzed to identify all possible offsets or corroborate possible offsets in a data row. For example, the offset for the occupation data field in the data set 200 cannot be determined solely by analyzing the padding mask of the OR resulting masks 203, as no padding exists between the phone number and the occupation data field. Instead, the numeric mask of the OR resulting masks 203 can be analyzed to determine where the mask changes from 1 to 0, which indicates the start of a new data field. Additionally, offsets indicated by the padding or numeric masks may be corroborated by identifying a point where the alphabetic mask of the OR resulting masks 203 transitions from 0 to 1.

In some implementations, one set of resulting masks may be used to identify offsets, e.g. the OR resulting masks 203 or the AND resulting masks 204. Which type of resulting masks, AND or OR, is constructed may vary depending on the data set. For example, a data set may contain data fields designed to hold string data types. In such an instance, generating AND resulting masks may be beneficial. String data fields will generally have at least one alphabetic token to indicate the beginning of each data field. Using the AND operation instead of the OR operation prevents occasional rows of data where two string data fields run together from appearing as a single data field in the resulting alphabetic mask.

Figure 3:
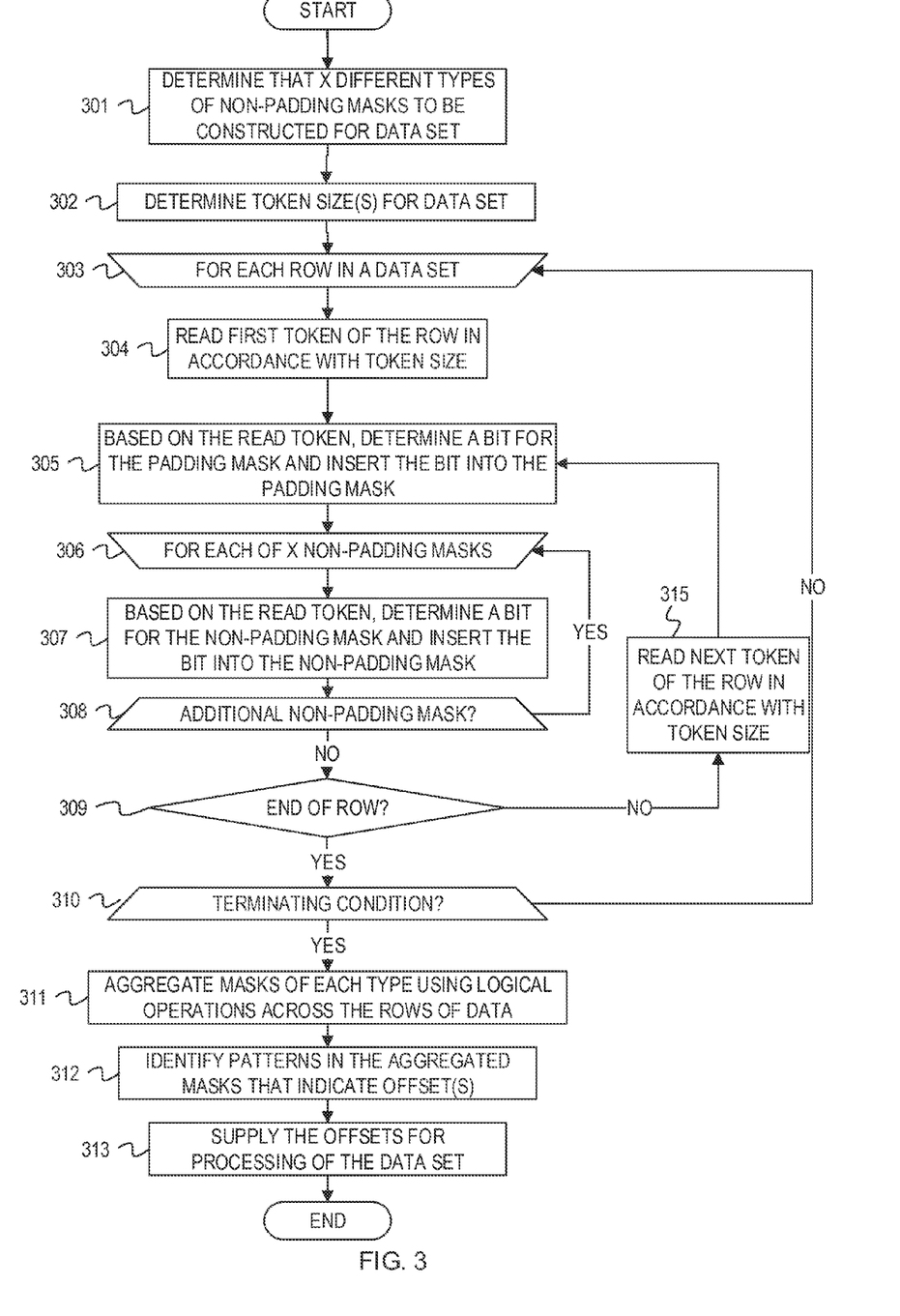
FIG. 3 depicts a flow diagram illustrating example operations for determining field locations for a data set with a padding mask and at least one non-padding mask.

FIG. 3 depicts a flow diagram illustrating example operations for determining field locations for a data set with a padding mask and at least one non-padding mask.

It is determined that x different types of non-padding masks are to be constructed for data set (301). Non-padding mask types can include alphabetic, symbolic, numeric, or any other type of specialized mask, such as a mask that identifies specific symbolic tokens. Additionally, a non-padding mask may be a mask that includes a 1 for each non-padding token detected in a row of data. The types of non-padding masks to be constructed may be pre-configured. Additionally, the types of non-padding masks to be constructed may be determined by detecting the different types of non-padding tokens in a data set. For example, in a data set containing alphabetic and padding tokens, an alphabetic mask will be constructed in addition to a padding mask. Or, for example, if alphabetic and numeric tokens are detected in a data set, then alphabetic and numeric masks will be constructed in addition to a padding mask. The number of non-padding masks to be constructed is indicated by the variable x. The variable x may be a configurable variable, or the value of the variable x may be set based on the number of diverse token types detected in a data set.

The token size for a data set is determined (302). The token size for a data set varies depending on the encoding of the data set. For example, a data set may use ASCII encoding which has a token size of eight bits. As an additional example, a numeric data set may be encoded in a packed data format wherein each numeric token is represented by four bits. Encoding of the data set may be communicated in a header or specified in advance or be an expected encoding based on the source of the data set.

After the token size for a data set is determined, a loop begins for the data set (303).

A first token is read in accordance with the determined token size (304). For instance, a byte is read from the current row if the token size is a byte.

After a token is read, a bit for the padding mask is determined based on the read token and inserted into the padding mask (305). As described above, a padding mask indicates wherever a padding token occurs in a row of data. For example, a padding mask may contain a 1 to indicate the occurrence of a padding token and a 0 to indicate a non-padding token. To determine a bit for the padding mask, the type of the read token is determined. If the read token is a padding token, then a 1 is inserted into the padding mask. If the read token is not a padding token, then a 0 is inserted into the padding mask.

After a bit for the padding mask has been determined and inserted, a loop in which each of x non-padding mask types is iterated over begins (306). The non-padding mask type currently being iterated over is referred to hereinafter as the "selected non-padding mask". During the first pass through process block 306, the selected non-padding mask is initialized to a first non-padding mask type. On each subsequent pass through process block 306, the selected non-padding mask is updated to be a different non-padding mask type. The loop continues until each of x non-padding mask types has been iterated over, i.e. the number of iterations is equal to the x types of non-padding masks.

A bit for the selected non-padding mask is determined based on the read token and inserted into the selected non-padding mask (307). To determine a bit for the selected non-padding mask, the type of the selected token is determined. Whether a 1 or a 0 for the read token is inserted into the selected non-padding mask depends on whether the type of the read token matches the mask type. For example, the selected non-padding mask may be an alphabetic mask. If the read token is an alphabetic token, then a 1 is inserted into the selected non-padding mask. If the read token is not an alphabetic token, then a 0 is inserted into the selected non-padding mask. Similarly, if the selected non-padding mask is a numeric mask, a 1 is inserted if the read token is a numeric token; otherwise, a 0 is inserted.

After a bit for the selected non-padding mask is determined and inserted into the selected non-padding mask, it is determined whether there is an additional non-padding mask (308). If there is an additional non-padding mask, the selected non-padding mask is updated to be a different non-padding mask type.

If there is not an additional non-padding mask, it is determined whether the end of the row has been reached (309). As mentioned earlier, the end of the row may be known in advance because all rows of a data set are a pre-defined length. In some cases, a delimiter indicating end of a row may be detected. If the end of the row has not been reached, the next token in the row is read in accordance with the token size (315). After reading the next token, a bit for the padding mask is determined based on the read token and inserted into the padding mask (305).

If the end of the row has been reached, it is determined whether a terminating condition is satisfied (310). The terminating condition for the loop may vary. For example, the loop may continue until all rows of the data set have been iterated over. Also, the loop may continue until a specified number of rows have been iterated over or until a percentage of rows in the data set have been iterated over. Additionally, the loop may be configured to iterate over a specified subset of rows of the data set or multiple subsets or rows of the data set. If the terminating condition is not satisfied, the next row in the data set is selected (303).

If the terminating condition is satisfied, the masks of each type are aggregated across the rows of data (311). The masks of each type are aggregated using a logical operation such as OR, AND, or XOR. A resulting or aggregated mask is created for each mask type. For the example operations depicted in FIG. 3, a resulting padding mask is created, and a resulting mask for each of the x different types of non-padding masks is created. As described in FIG. 2, resulting mask variations may also be created by performing logical operations on the aggregated masks.

After all masks have been aggregated, patterns that indicate an offset are identified in the aggregated masks (312). Patterns can be identified as described in FIGS. 1 and 2.

After the patterns that indicate offsets are identified, the offsets are supplied for processing of the data set (313). The offsets are those indicated by the identified patterns. Offsets may be supplied in any format for use by a system or for storage on a file system. Offsets may be supplied for use on a local system or indicated over a network for use on a remote system. The offsets may be used by the system to ascertain the location of data fields in the data. Alternatively, the offsets may be used to add delimiters between data fields of a data set. For example, a comma may be inserted between each data field. In such an instance, the delimited data set may be supplied to a system instead of the offsets. Furthermore, in addition to the offsets, the aggregated masks may be supplied. The aggregated masks of each type may be utilized by a system to determine the data types contained in each data field. Once the offsets are supplied, the process ends.

Figure 4:
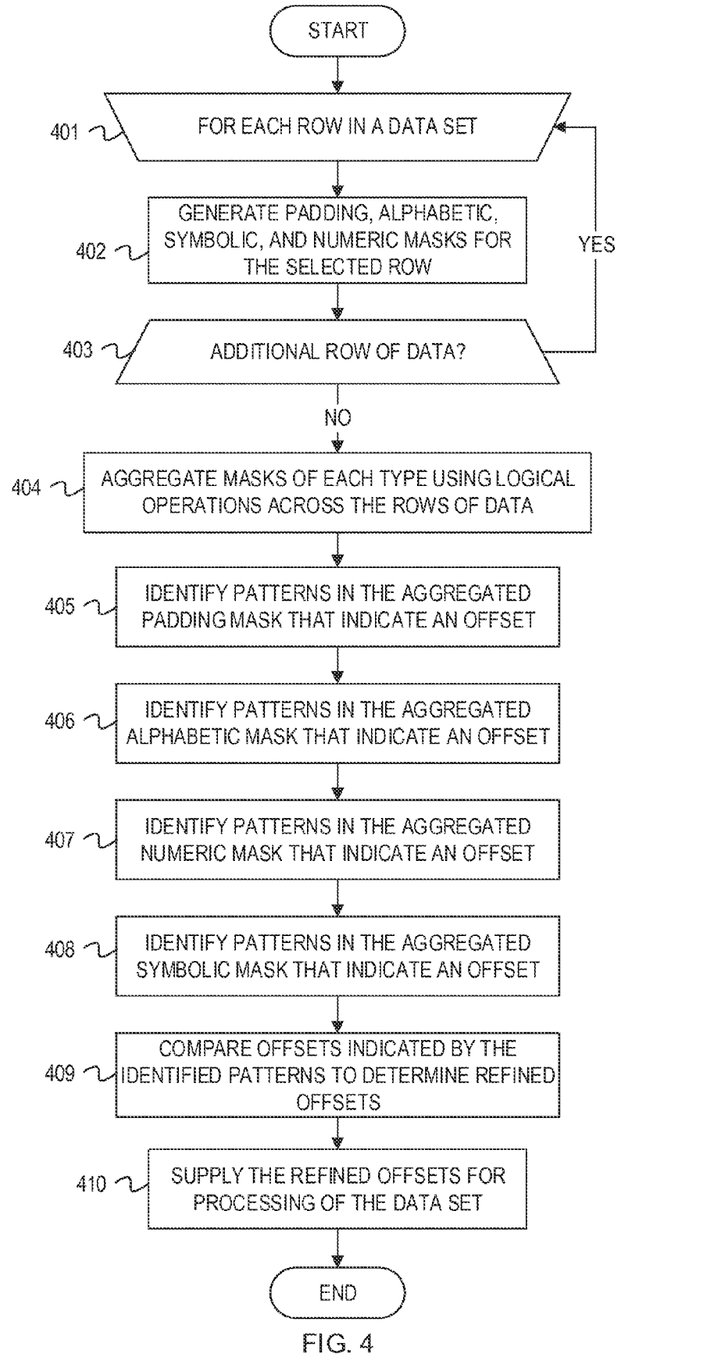
FIG. 4 depicts a flow diagram illustrating example operations for determining offsets for a data set with a padding mask, an alphabetic mask, a numeric mask, and a symbolic mask.

FIG. 4 depicts a flow diagram illustrating example operations for determining offsets for a data set with a padding mask, an alphabetic mask, a numeric mask, and a symbolic mask.

A loop begins for a data set (401). The loop continues until all masks have been generated for all rows in the data set. In some embodiments, the loop may continue until masks have been generated for a specified number of rows or until masks have been generated for a percentage of rows in the data set. Additionally, the loop may be configured to process a specified subset of rows of the data set to generate masks for the specified subset of rows. The row of data on which the operations below are currently being performed is referred to hereinafter as the "selected row".

Masks are generated for the selected row (402). Padding, alphabetic, numeric, and symbolic masks are generated. The masks are generated in a manner similar to the example illustration of FIG. 1 and as described in more detail in the flow diagram of FIG. 5. In some implementations, a subset of the masks may be generated. For example, padding and alphabetic masks may be generated.

After the padding, alphabetic, numeric, and symbolic masks are generated for the selected row, it is determined whether there is an additional row of data (403). If there is an additional row, the next row in the data set is selected (401).

After all rows have been processed, the masks of each type are aggregated across the rows of data (404). The masks of each type are aggregated using a logical operation such as OR, AND, or XOR. A resulting or aggregated mask is created for each mask type. For the example operations depicted in FIG. 4, four aggregated masks would be created: an aggregated padding mask, an aggregated alphabetic mask, an aggregated numeric mask, and an aggregated symbolic mask. As described in FIG. 2, resulting or aggregated mask variations may also be created by performing logical operations on the aggregated masks.

After all masks have been aggregated, patterns that indicate an offset are identified in the aggregated padding mask (405). As described in FIG. 2, points where the padding mask transitions from a 1 to a 0 likely indicate the location of a new data field. The offsets indicated by the 1 to 0 pattern are stored, so they may later be compared to offsets indicated by the other aggregated mask types.

Patterns that indicate an offset are identified in the aggregated alphabetic mask (406). As described in FIG. 2, points where the alphabetic mask transitions from a 0 to a 1 likely indicate the location of a new data field. The offsets indicated by the 1 to 0 pattern are stored, so they may later be compared to offsets indicated by the other aggregated mask types.

Patterns that indicate an offset are identified in the aggregated numeric mask (407). As described in FIG. 2, points where the numeric mask transitions from a 0 to a 1 likely indicate the location of a new data field, and points where the numeric mask transitions from a 1 to a 0 likely indicate the end of a data field. The offsets indicated by the 1 to 0 and 0 to 1 patterns are stored, so they may later be compared to offsets indicated by the other aggregated mask types.

Patterns that indicate an offset are identified in the aggregated symbolic mask (408). Points where the symbolic mask transitions from a 0 to a 1 likely indicate the location of a new data field. For example, the beginning of a data field that contains a dollar amount, such as "$1.99," would be indicated by a 0 to 1 transition in the aggregated symbolic mask. The offsets indicated by the 0 to 1 patterns are stored, so they may later be compared to offsets indicated by the other aggregated mask types.

Offsets indicated by the identified patterns are compared to determine refined offsets (409). Offsets identified in each of the aggregated masks may be combined to form a refined set of offsets. However, confidence in the identified locations of data fields can be improved by comparing the offsets identified by the different mask types. For example, a 1 to 0 pattern in an aggregated padding mask may indicate an offset at the tenth byte of a data row, and a 0 to 1 pattern in an aggregated alphabetic mask may also indicate an offset at the tenth byte of a data row. Because the same offset is indicated by two different mask types, the confidence that a new data field begins at the tenth byte location is greater. A system can be configured to always include offsets indicated by a padding mask but to only include offsets indicated by other mask types if those offsets are corroborated by one or more of the other aggregated mask types. For example, an offset indicated in an aggregated numeric mask may not be included in the refined offsets if it is not corroborated by another aggregated mask, such as an aggregated alphabetic mask.

After the refined offsets have been determined, the refined offsets are supplied for processing of the data set (410). The refined offsets can be supplied in a manner similar to how the offsets are supplied in process block 313 of FIG. 3. Once the refined offsets are supplied, the process ends.

Figure 5:
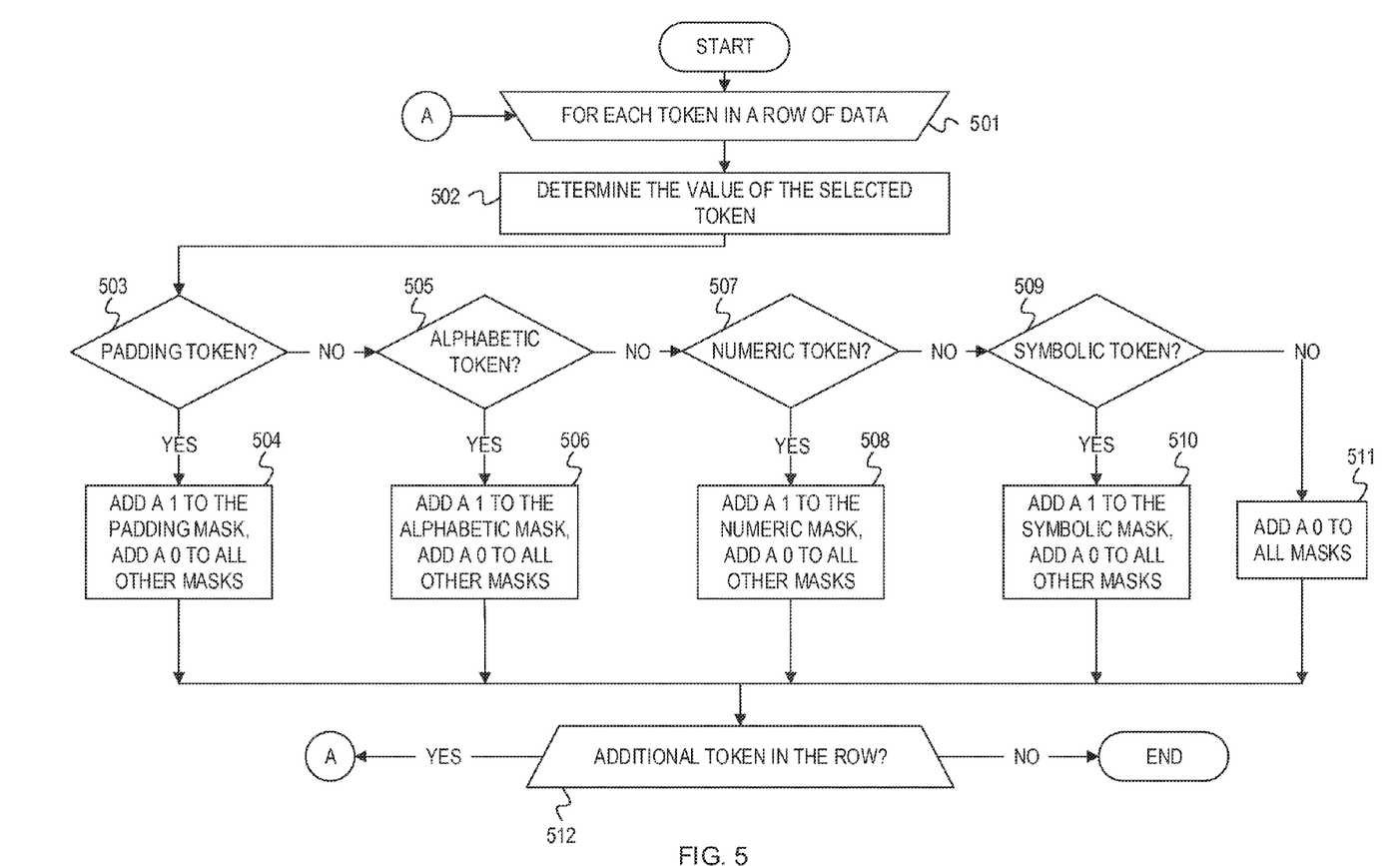
FIG. 5 depicts a flow diagram illustrating example operations for creating masks for a row of data.

FIG. 5 depicts a flow diagram illustrating example operations for creating masks for a row of data. FIG. 5 could be example operations for process block 402 of FIG. 4.

A loop begins for a row of data (501). The loop continues until a bit has been inserted into each mask for each token in a row of data.

The value of a token is determined (502). The value of the token is the machine representation of the token. For example, the value of a token may be, in binary, 00100000. The value of the token is compared to a character-encoding table to determine the token type. If a token has a value of 00100000, the value may be compared to a table of ASCII character codes to determine that the token contains the value for a space or padding token. Other character-encoding schemes may be used, such as Unicode or Extended Binary Coded Decimal Interchange Code. For purposes of comparing the value, the value of the token may be converted from binary into any other number format, such as decimal, hexadecimal, or octagonal.

It is determined whether the token is a padding token (503). Whether the token is a padding token is determined by comparing the token value to the character code or encoding value for a space or padding token. As described above, the ASCII character code for a space is 00100000. So, if the value of the token is equal to 00100000, then it is determined that the token is a padding token. Additionally, a tab character may be considered a padding token, since a tab also constitutes white space. The ASCII character code for a tab is 00001001. So, if the value of the token is equal to 00001001, then it is also determined that the token is a padding token.

If it is determined that the token is a padding token, a 1 is added to a padding mask, and a 0 is added to all other masks (504). Since it was determined that the token is a padding token, a 1 is added to the padding mask to indicate that the location of the token in the data row contains a padding token. Since the token is a padding token, a 0 is added to all other masks as it can be assumed that the token is not an alphabetic token, a numeric token, or a symbolic token.

If it is determined that the token is not a padding token, it is determined whether the token is an alphabetic token (505). Whether the token is an alphabetic token is determined by comparing the token value to the range of character code values for an alphabetic token. For example, the ASCII character code ranges for alphabetic tokens are, in hexadecimal, [41, 5A] and [61, 7A]. So, if the value of the token is within either of these ranges, then it is determined that the token is an alphabetic token.

If it is determined that the token is an alphabetic token, a 1 is added to an alphabetic mask, and a 0 is added to all other masks (506). Since it was determined that the token is an alphabetic token, a 1 is added to the alphabetic mask to indicate that the location of the token in the data row contains an alphabetic token. Since the token is an alphabetic token, a 0 is added to all other masks as it can be assumed that the token is not a padding token, a numeric token, or a symbolic token.

If it is determined that the token is not an alphabetic token, it is determined whether the token is a numeric token (507). Whether the token is a numeric token is determined by comparing the token value to the range of character code values for a numeric token. For example, the ASCII character code range for numeric tokens is, in hexadecimal, [30, 39]. So, if the value of the token is within the range, then it is determined that the token contains a numeric token.

If it is determined that the token is a numeric token, a 1 is added to a numeric mask, and a 0 is added to all other masks (508). Since it was determined that the token is a numeric token, a 1 is added to the numeric mask to indicate that the location of the token in the data row contains a numeric token. Since the token is a numeric token, a 0 is added to all other masks as it can be assumed that the token is not a padding token, an alphabetic token, or a symbolic token.

If it is determined that the token is not a numeric token, it is determined whether the token is a symbolic token (509). Whether the token is a symbolic token is determined by comparing the token value to the range of character code values for a symbolic token. For example, the ASCII character code ranges for symbolic tokens are, in hexadecimal, [21, 2F], [3A, 40], [5B, 60], and [7B, 7E]. So, if the value of the token is within any of the ranges, then it is determined that the token contains a symbolic token.

If it is determined that the token is a symbolic token, a 1 is added to a symbolic mask, and a 0 is added to all other masks (510). Since it was determined that the token is a symbolic token, a 1 is added to the symbolic mask to indicate that the location of the token in the data row contains a symbolic token. Since the token is a symbolic token, a 0 is added to all other masks as it can be assumed that the token is not a padding token, an alphabetic token, or a numeric token.

If it is determined that the token is not a symbolic token, a 0 is added to all masks (511). A 0 is added to all masks once it has been determined that the token does not contain a padding token, an alphabetic token, a numeric token, or a symbolic token. Since the token is not within any of the token types, a 0 is added to all the masks. Adding a 0 to all masks allows for mask creation to continue in the event that a token containing an unknown token is encountered.

Once a bit for the token has been added to all masks, it is determined whether the row of data contains an additional token (512). If there is an additional token, the next token in the row of data is selected. If a bit has been added to each mask for all tokens in a row of data, then the process ends.

Figure 6:
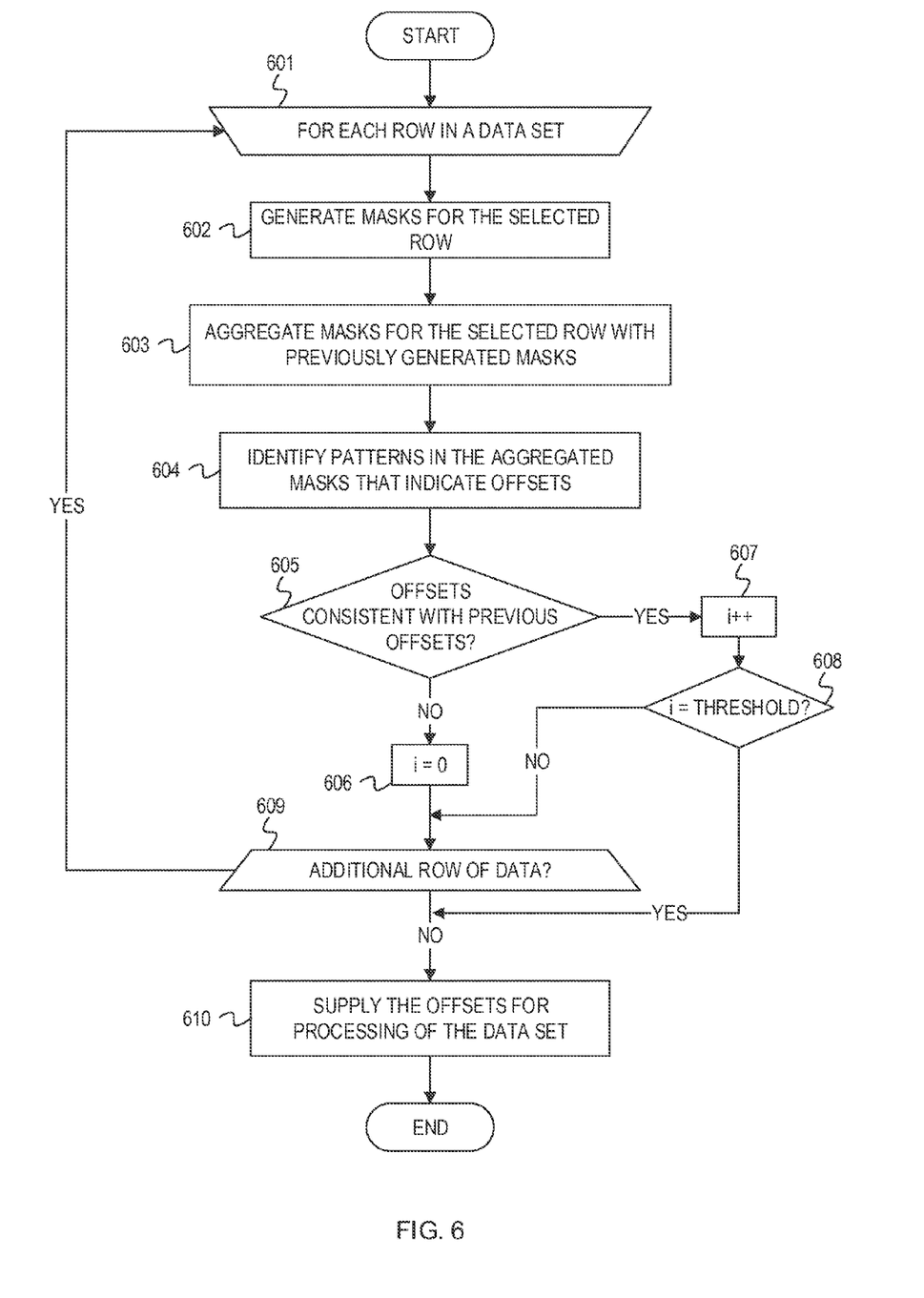
FIG. 6 depicts a flow diagram illustrating example operations for determining offsets for a data set until the offsets stabilize.

FIG. 6 depicts a flow diagram illustrating example operations for determining offsets for a data set until the offsets stabilize.

A loop for a data set begins (601). The loop may continue until all rows in the data set have been iterated over if the offsets do not stabilize earlier. The row of data on which the operations below are currently being performed is referred to hereinafter as the "selected row".

Masks are generated for the selected row (602). The masks are generated in manner similar to the flow diagram of FIG. 5. The generated masks may include a padding mask, an alphabetic mask, a numeric mask, and a symbolic mask. In some implementations, a subset of the masks may be generated. For example, a padding and an alphanumeric masks may be generated.

The masks of for the selected row are aggregated with previously generated masks (603). The masks for the selected row are aggregated with all masks previously generated during operations of the loop beginning at block 601. For example, if the loop beginning at block 601 has generated masks for three rows, masks for the first, second, and third rows would be aggregated. In some instances, masks for the selected row may be successively or incrementally aggregated. For example, if an aggregated mask was created with the masks of the first and second rows, the masks generated from the third row may be aggregated with the previous aggregated mask to form a new aggregated mask. Masks of each type are aggregated using a logical operation such as OR, AND, or XOR or another aggregation technique. An aggregated mask is created for each mask type.

Patterns that indicate an offset are identified in the aggregated masks (604). Patterns are identified as described in FIGS. 1, 2, and 4.

Whether the offsets are consistent with previous offsets is determined (605). The offsets are compared to the offsets generated during the previous operation of the loop beginning at process block 601. The offsets may be different upon each operation of the loop as masks for an additional row of data are aggregated and analyzed. The offsets are said to be consistent if they are equal to the previous offsets. For example, previous offsets may be 0, 10, and 15, and current offsets may be 0, 10, and 15. These offsets are consistent. If the current offsets were 0, 9, and 15, then the offsets would not be consistent. In some embodiments, the offsets may be considered consistent if they are within a specified tolerance. For example, if the offsets differ by 1, i.e. the previous offsets contain a 10 and the current offsets contain a 9, then the offsets may be considered consistent if the configured tolerance allows for a difference of 1.

If the offsets are not consistent, the variable i is set to a value of 0 (606). The variable i is used to track the number of consecutive rows with consistent offsets. Each time the offsets are not consistent, the variable i is reset to 0.

If it was determined that the offsets are consistent with the previous offsets, the variable i is incremented (607). The variable i has an initial value of 0 and is incremented by 1 each time the offsets are consistent with the previous offsets. As described above, the variable i is reset to 0 each time the offsets are inconsistent. Because i is reset to 0 upon inconsistent offsets, the value of i indicates the number of consecutive rows with consistent offsets.

Whether i is equal to a threshold is determined (608). The threshold is the minimum number of consecutive rows with consistent offsets before the loop beginning at process block

601 is terminated. For example, the threshold may be a configurable variable set to a value of five, meaning that the offsets must be consistent for five consecutive rows. Satisfying the threshold indicates that the offsets have stabilized and increases confidence that the likely data field locations have been found. Alternative stabilization thresholds are possible. Stabilization may be determined based on a percentage of rows indicating a same set of data field locations. For example, if 60% of the rows for which masks have been generated indicate the same data field locations, the offsets may be considered stabilized and the loop beginning at process block 601 terminated. As another example, stabilization may be determined based on a threshold, not for consecutive consistent rows, but for a total number of rows that indicate the same offsets. In the case of tracking consistency across rows regardless of order, a counter can be maintained for each different pattern. To avoid tracking extraneous or likely unuseful patterns, counters may be maintained if a defined criterion is satisfied (e.g., at least n consecutive rows have the pattern, at least n rows in a window size of m rows have the pattern, etc.). If the threshold is satisfied, the loop beginning at process block 601 may terminate even if there are still additional rows of data in the data set.

If the variable i was set to 0 or if the variable i did not satisfy the threshold, whether there is an additional row of data is determined (609). If there is an additional row, the next row in the data is selected and the loop beginning at process block 601 begins again. If all rows have been iterated over, then the loop terminates. The loop may also terminate based on other termination conditions. For example, the loop may terminate if 50% of the rows of a data set have been analyzed but no rows with consistent offsets have occurred.

If it was determined that all rows have been iterated over or that the variable i was equal to the threshold, the offsets are supplied for processing of the data set (610). The offsets are those indicated by the identified patterns. If the threshold was satisfied, then the identified offsets were consistent for a threshold number of rows. However, if the threshold was not satisfied, then no identified offsets remained consistent for a threshold number of rows. In this instance, the most recently identified offsets may be supplied. A system may also supply offsets that were consistent for the highest number of consecutive rows. For example, even if the threshold is five rows, offsets that were consistent for four rows may be supplied. Once the offsets are supplied, the process ends.

As depicted in FIG. 2, one of the resulting mask variations 205 was created by OR'ing together all mask types of the resulting masks 203. This mask, as depicted in FIG. 2, contains all 1's, which indicates that each token location in the data rows contains either a padding, an alphabetic, a numeric, or a symbolic token. A 0 in the mask (the mask resulting from OR'ing together all of the token specific masks) would indicate that the corresponding token location in the data rows contains data that is not recognized as a padding, alphabetic, numeric, or a symbolic token, in this example. The failure to recognize can arise because of a different token size than the token size guiding the parsing of the data. For instance, a data field with a 4-bit token may not be discernible when read with adjacent data based on 8 bit parsing. The 8-bits that are read may be 2 4-bit tokens or a 4-bit token and part of a larger token. In either case, the token that is read may not fall into any of a padding, an alphabetic, a numeric, or a symbolic token category because the row is parsed based on an expected byte size token. Hence, the unrecognized data can be considered unrecognized tokens and corresponding locations be considered unrecognized token locations. The unknown token locations may be parsed further as described in FIG. 7 in order to determine the appropriate token size for the unknown tokens. Additionally, the masks for each row may be updated to represent the unknown tokens.

Figure 7:
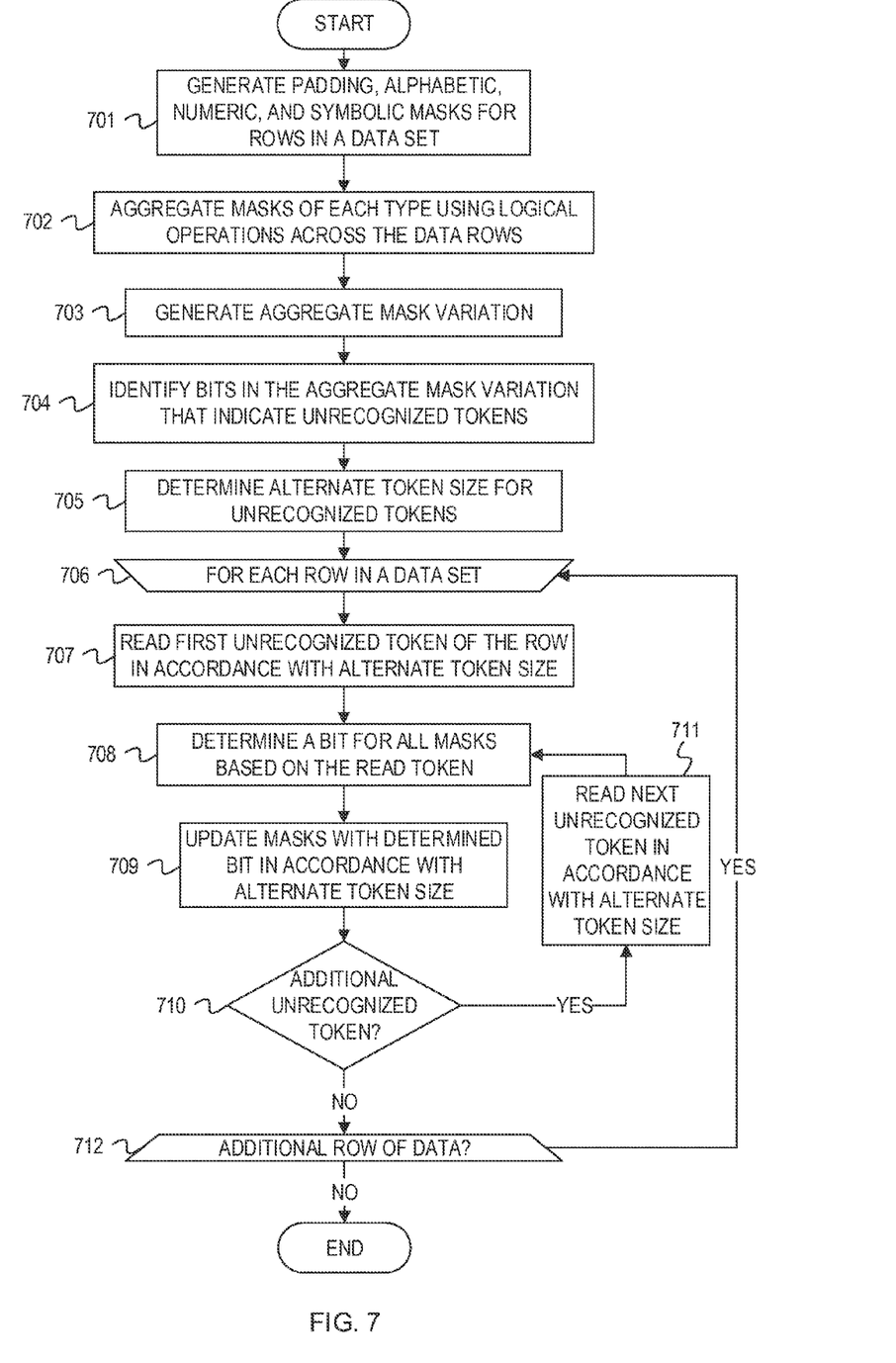
FIG. 7 depicts a flow diagram illustrating example operations for generating masks for a data set with varying token sizes.

FIG. 7 depicts a flow diagram illustrating example operations for generating masks for a data set with varying token sizes.

Padding, alphabetic, numeric, and symbolic masks are generated for rows of a data set (701). The masks are generated in a manner similar to that of FIG. 5. The masks are generated based on a token size determined for the data set. For example, a token size defined (e.g., as a default token size for a mask generator) for parsing the data set may be the determined token size for the data set, so the masks would be generated using the defined parsing token size (e.g., one byte). Additionally, the token size can be dynamically determined for a data set. A mask generator, for example, can analyze a first row of data of a data set to determine a token size(s) for that row. For example, a mask generator may parse the first row based on a default token size of a byte. If the first token is not recognized based on that one byte token size, then the mask generator may reparse the first row of data based on a smaller token size (e.g., 4-bit token size). A parsing or processing component associated with the mask generator can repeatedly parse the first row of the data set based on different token sizes until a token is recognized. In this flow chart, the data set is parsed based on an initial defined token size and an alternate token size(s) is accounted for during subsequent mask creation as described below.

The masks are aggregated across the data rows (702). In this implementation, the masks are aggregated using an OR logical operation.

An aggregate mask variation is generated (703). As described in FIG. 2, aggregate or resulting mask variations may be generated by performing logical operations using the aggregated masks. In this implementation, an aggregate mask variation is formed by OR'ing together the aggregated padding mask, aggregated alphabetic mask, aggregated numeric mask, and aggregated symbolic mask. This aggregated mask variation is used to identify locations in a row of data with an unrecognized token(s). A 0 in the aggregate mask variation indicates an unrecognized token(s) at that location. A 1 indicates that a token has already been determined for that location.

Bits in the aggregate mask variation that indicate unrecognized tokens are identified (704). As described above, the aggregate mask variation will contain a 0 for each location in the data rows that did not contain a recognized token and instead contained an unrecognized token. The locations may be recorded or stored for use when generating new masks for the data set.

An alternate token size for the unrecognized token(s) is determined (705). The locations in the data rows that contain unrecognized tokens are analyzed to determine the alternate token size. A parsing or processing component may repeatedly parse an unrecognized token location using different token sizes until a token(s) is recognized. For example, a parsing component may parse using common token size formats. For example, the locations may be parsed to determine if the unrecognized token location contains packed data. Since packed data represents integers using 4-bits, the alternate token size for the locations with packed data would be 4-bits. As an additional example, the locations may be parsed to determine if the data is encoded using a 16-bit Unicode Transformation Format. In that instance, the alternate token size for the locations would be 16-bits.

A loop for each row in a data set begins (706).

A first unrecognized token of the row is read in accordance with the alternate token size (707). The first unrecognized token in a data row is read from the first location at which a 0 occurs in the aggregate mask variation. The unrecognized token may be read by extracting a number of bits equal to the alternate token size from the unrecognized token location.

A bit for the read token is determined for all masks (708). A bit for the read token is determined in a manner similar to that described in FIG. 5. A bit for each mask is determined according to the token type of the read token. For example, if the read token is a numeric token, the determined bit for the numeric mask would be a 1, and the determined bit for the padding, alphabetic, and symbolic masks would be a 0. Even though the read token is of an alternate token size, the read token is still represented by a single bit in the masks. A bit for the alternately-sized tokens may be determined using a different encoding scheme than tokens of the original token size. The encoding scheme may be the encoding scheme discovered while determining the alternate token size in process block 705.

The masks are updated with the determined bit in accordance with the alternate token size (709). The masks of each type generated at process block 701 for the current row of data are updated with the determined bit for the read token. Each of the masks will contain a 0 in the unrecognized token location. The unrecognized token location is updated with the value of the determined bit for the mask type. As in the example above, if the read token is a numeric token, the 0 in the unrecognized token location in the numeric mask is updated with a 1. The 0 in the padding, alphabetic, and symbolic masks would remain as the read token is of the numeric token type. In some instances, depending on the alternate token size, an additional bit may be added to the masks instead of updating the existing bit. For example, the originally determined token size may have been 8-bits, and the alternate token size may be 4-bits. In this instance, the 0 bit in each of the masks representing the unrecognized token location will be replaced by two bits, one for each 4-bit token. As a result, the updated masks may contain more bits than the original masks generated at process block 701. In other instances, the updated masks may contain fewer bits than the original masks generated at process block 701. For example, the originally determined token size may have been 8-bits, and the alternate token size may be 16-bits. In this instance, two 0 bits in each of the masks representing the unrecognized token location will be replaced by one bit to represent the 16 bit token.

After updating the masks, it is determined whether the data row contains an additional unrecognized token (710). If the data row does not contain an additional unrecognized token, it is determined whether there is an additional row in the data set (712). If there is not an additional row in the data set, the process ends.

If the data row contains an additional unrecognized token, the next unrecognized token is read in accordance with the alternate token size (711). Generally, the next unrecognized token is at the location of the next 0 in the aggregate mask variation. However, depending on the alternate token size, multiple tokens may be present at the unrecognized token location indicated by the aggregate mask variation. For example, if the original token size was 8-bits and the alternate token size is 4-bits, two tokens are read before moving to the location of the next 0 in the aggregate mask variation. All tokens are accounted for before moving to the location of the next 0 in the aggregate mask variation. In instances where the alternate token size is larger than the original token size, unrecognized tokens may be represented by multiple 0's in the aggregate mask variation. For example, if the original token size was 8-bits and the alternate token size is 16-bits, two 0's in the aggregate mask variation represent one unrecognized token. In this instance, the next unrecognized token is read from every other location of a 0 in the aggregate mask variation, i.e. each pair of 0's is considered one location.

After the masks generated at process block 701 are updated, the masks may be aggregated again and analyzed to determine offsets in a manner similar to that described in FIGS. 1, 2, and 4. Additionally, another aggregate mask variation may be created using the new aggregated masks and analyzed to determine if the data set contains additional unrecognized tokens of a different token size. The process may be repeated until all token sizes in a data set have been accounted for, i.e. until the aggregate mask variation includes all 1's indicating that no unrecognized tokens remain.

Communication of the offsets may be affected because of the varying token sizes. When data rows contain a uniform token size, locations of data fields may be communicated using integers that correspond the number of tokens that a data field is offset from the beginning of a data row, i.e. 0, 10, 20, etc. These offsets may be multiplied by a token size to determine a data field's location, e.g. multiplying 10 by a token size of 1 byte to determine that the data field begins 10 bytes after the beginning of the row. In the case of varying token sizes, this same technique may result in incorrectly determining the location of a data field. As a result, information about the alternate size and locations of tokens may need to be communicated in addition to offsets. For example, if a data field begins at the tenth token location, it could be determined that two tokens at token locations four and five are 16-bit, e.g. 2 byte, tokens and all other tokens are 1 byte. In this instance, the location of the data field is determined by multiplying 8 tokens by 1 byte and 2 tokens by 2 bytes, i.e. the data field is offset by 12 bytes.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, it may be determined whether a token is a numeric token (block 507 of FIG. 5) before it is determined whether a selected token is a padding token (block 503 of FIG. 5). As another example, the aggregation of masks that occurs (block 311 of FIG. 3 and block 404 of FIG. 4) may be performed in conjunction with the generation of the masks (blocks 303-310 of FIG. 3 and blocks 401-403 of FIG. 4). For example, once masks for at least two rows have been generated, aggregated masks for the two rows may be created. The aggregated masks may then be updated by aggregating with masks generated for subsequent rows. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

The example operations above may be altered or performed in different orders to allow for the creation of different mask types, such as a mask that includes a 1 for both alphabetic and numeric tokens. Similarly, some operations may be removed or additional operations performed to adjust for the number of and desired mask types. For example, an operation to create a mask that includes a 1 for each occurrence of a parenthesis in a row of data may be added before block 509. Additionally, operations may be added to create masks tailored to fit a specific data set. For example, an operation may be configured to add a 1 to a mask for each token that is a "$", a ".", or a numeric token. Such a mask could be used to identify offsets for data fields that contain dollar amounts.

Some operations above iterate through sets of items, such as the tokens in a row of data, in an order from first to last. In some implementations, tokens in a row of data may be iterated over from the last token to the first token. Also, the number of iterations for loop operations may vary. Different techniques for creating masks may require fewer iterations or more iterations. For example, more iterations would be required if each mask is built sequentially instead of in parallel as described in FIG. 5. Additionally, a loop may not iterate for each row of data in a set of data (block 310 of FIG. 3). As described in relation to block 310 of FIG. 3, a loop may terminate early after masks have been created for a certain number of rows, a specified subset of rows, or percentage of the total rows of a data set. Furthermore, as described in relation to block 608 of FIG. 6, a loop may terminate early if the determined offsets have stabilized for a threshold number of rows.

Furthermore, operations described above may be repeated on multiple subsets of a data set. For example, offsets may be determined for a first ten rows of a data set, then a middle ten rows of a data set, and then the last ten rows of a data set. The offsets determined from the subsets of rows may be compared together to establish if offsets remain consistent throughout the data set. Alternatively, the resulting masks from the different subsets may be aggregated and then analyzed to determine offsets to be applied to the entire data set.

FIG. 7 describes operations for creating masks for a data set with varying token sizes. The operations of FIG. 7 describe generating masks using a determined token size and then updating those masks with information related to tokens of an alternate size. However, in some implementations, all token sizes for a data set and their location within the data set may be determined before generating masks. In such an implementation, masks may be generated using a mask generation process that accounts for the known alternate token size locations.

FIGS. 1 and 2 depict data sets that contain at least two rows. However, a mask or masks can be constructed for a single row of data and used to identify data field locations beyond that single row, or limited to that row or a subset of rows within a data set. In instances where data field locations vary among rows, masks for a single row may be analyzed to determine the data field locations for the corresponding row (or subset of similar rows).

In the description above, logical operations are used to aggregate masks across rows of data. Masks may also be aggregated using different methods such as addition or subtraction. For example, padding masks from three rows may be 0011, 0010, and 0011. Adding the corresponding bits of the padding masks together would create a resulting mask 0032, indicating that three padding tokens occur at the third byte location in a data row and 2 padding tokens at the fourth byte location. An offset may be determined by identifying the byte location with the highest number of padding tokens, e.g. the third byte location in this example.

The variations described above do not encompass all possible variations, implementations, or embodiments of the present disclosure. Other variations, modifications, additions, and improvements are possible.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
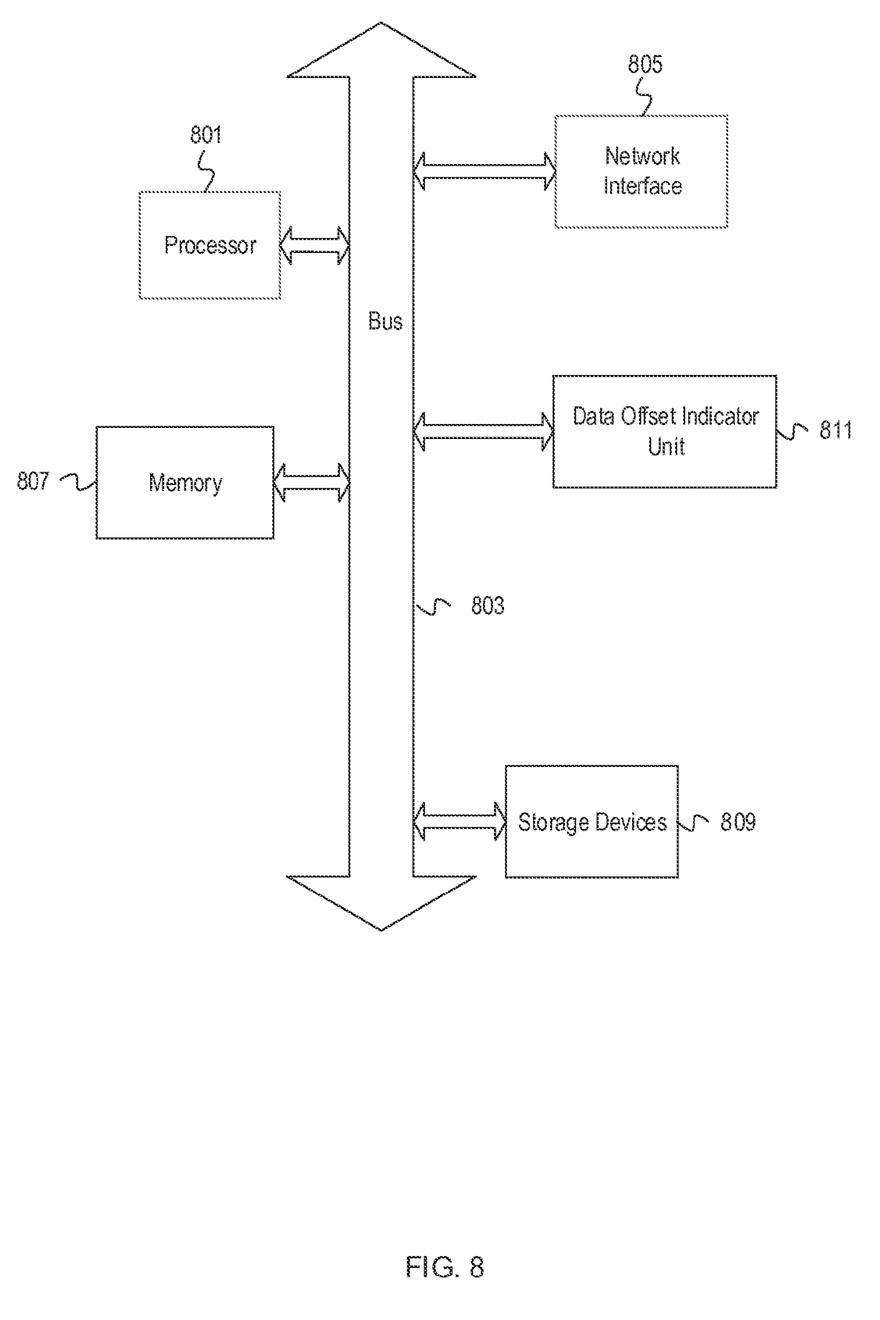
FIG. 8 depicts an example computer system with a data offset indicator unit.

FIG. 8 depicts an example computer system with a data offset indicator unit. The computer system includes a processor unit 801 (possibly including multiple processors, multiple cores, multiple nodes, and/or implementing multithreading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, Hyper-Transport® bus, InfiniBand® bus, NuBus, etc.) and a network interface 805 (e.g., a Fiber Channel interface, an Ethernet interface, an internet small computer system interface, SONET interface, wireless interface, etc.). The system also includes a data offset indicator unit 811. The data offset indicator unit 811 identifies and indicates offsets of data fields in a set of unstructured data. Any one of the previously described functionalities may be partially (or entirely) implemented in hardware and/or on the processing unit 801. For example, the functionality may be implemented with an application specific integrated circuit, in logic implemented in the processing unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801 and the network interface 805 are coupled to the bus 803. Although illustrated as being coupled to the bus 803, the memory 807 may be coupled to the processor unit 801.

While the aspects of the disclosure are described with reference to various implementations and exploitations, it will be understood that these aspects are illustrative and that the scope of the claims is not limited to them. In general, techniques for identifying data field offsets as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of . . . or" should not be construed to be exclusive. For instance, the phrase "X comprises at least one of A, B, or C" does not mean that X comprises only one of {A, B, C}; it does not mean that X comprises only one instance of each of {A, B, C}, even if any one of {A, B, C} is a category or sub-category; and it does not mean that an additional element cannot be added to the non-exclusive list (i.e., X can comprise {A, B, Z}).

The above description refers to unstructured data, and data entries (e.g., rows, records, etc.). If a data set entry is known or defined for a data set (e.g., a data set entry is 64 bytes), then it can be argued that the data set has structure. When referring to unstructured data, this description is referring to the unstructured data entry. As explained above, the record length or row size may be known for a data set, but the data fields within a data set entry can be unknown. In other words, one dimension (e.g., row) of a data set is known while another dimension (e.g., column) is unknown. To avoid encumbering the claims with a list of examples of data set entries and dimensions, the claims will refer to an unstructured data set entry. And examples of an unstructured data set entry include a row of data with unknown data field locations, a vector in a data set with unknown data field locations, a record in a data set with unknown data field locations, and a block of data with unknown data field locations.

What is claimed is:

1. A method comprising:
for each unstructured entry of at least a subset of unstructured entries of a data set,
creating a padding mask that indicates inferred locations of fields within the unstructured entry based on a detected padding token,
creating a first token mask that indicates inferred locations of fields within the unstructured entry based on a detected first non-padding token;
aggregating the padding masks across the subset of unstructured entries to generate an aggregate padding mask for the data set;
aggregating the first token masks across the subset of unstructured entries to generate an aggregate first token mask for the data set;
determining inferred locations of fields of the unstructured entries of the data set based, at least in part, on the aggregate padding mask and the aggregate first token mask; and
indicating the inferred locations of fields of the unstructured entries of the data set.

2. The method of claim 1, wherein determining inferred locations of fields of the unstructured entries of the data set comprises determining where transitions occur between indications of different tokens using the aggregate padding mask and the aggregate first token mask.

3. The method of claim 1, wherein creating a padding mask that indicates inferred locations of fields within the unstructured entry based on a detected padding token comprises inserting a bit in the padding mask that indicates whether a padding token is present at the location of a token read from the unstructured entry, wherein creating a non-padding mask that indicates inferred locations of fields within the unstructured entry based on a detected first non-padding token comprises inserting a bit in the first token mask that indicates whether a non-padding token is present at the location of a token read from the unstructured entry.

4. The method of claim 1, further comprising determining a token size of tokens in the data set.

5. The method of claim 1, wherein aggregating the padding masks across the subset of unstructured entries to generate an aggregate padding mask for the data set comprises performing a logical operation on the padding masks, wherein aggregating the first token masks across the subset of unstructured entries to generate an aggregate first token mask for the data set comprises performing a logical operation on the first token masks.

6. The method of claim 1, wherein creating a first token mask that indicates inferred locations of fields within the unstructured entry based on a detected first non-padding token comprises detecting one or more non-padding tokens within the unstructured entry and indicating corresponding location or locations.

7. The method of claim 6 wherein a non-padding token includes one or more of an alphabetic token, a numeric token, an alphanumeric token, and a symbolic token.

8. The method of claim 7, further comprising:
for each unstructured entry of at least a subset of unstructured entries of a data set, creating a second token mask that indicates inferred locations of fields within the unstructured entry based on a detected second non-padding token, wherein the second non-padding token is different from the first non-padding token; and
aggregating the second token masks across the subset of unstructured entries to generate an aggregate second token mask for the data set.

9. The method of claim 8, wherein determining inferred locations of fields of the unstructured entries of the data set comprises determining where transitions occur between indications of a non-padding token and a different non-padding token using the aggregate first token mask and the aggregate second token mask.

10. The method of claim 1, wherein indicating inferred locations of fields of the unstructured entries of the data set comprises inserting a delimiter between each field of rows of the data set based, at least in part, on the inferred locations of fields.

11. The method of claim 1, wherein indicating inferred locations of fields of the unstructured entries of the data set comprises storing inferred locations of fields of the unstructured entries of the data set in memory.

12. The method of claim 1, further comprising determining whether the inferred locations of fields of rows of the data set remained consistent for a threshold number of rows of the data set.

13. One or more machine-readable storage media having program code stored therein, the program code to:
for each unstructured entry of at least a subset of unstructured entries of a data set,
create a padding mask that indicates inferred locations of fields within the unstructured entry based on a detected padding token,
create a first token mask that indicates inferred locations of fields within the unstructured entry based on a detected first non-padding token;
aggregate the padding masks across the subset of unstructured entries to generate an aggregate padding mask for the data set;
aggregate the first token masks across the subset of unstructured entries to generate an aggregate first token mask for the data set;
determine inferred locations of fields of the unstructured entries of the data set based, at least in part, on the aggregate padding mask and the aggregate first token mask; and
indicate the inferred locations of fields of the unstructured entries of the data set.

14. An apparatus comprising:
a processor; and
a machine-readable medium having program code executable by the processor to cause the apparatus to,
for each unstructured entry of at least a subset of unstructured entries of a data set,
create a padding mask that indicates inferred locations of fields within the unstructured entry based on a detected padding token,
create a first token mask that indicates inferred locations of fields within the unstructured entry based on a detected first non-padding token;
aggregate the padding masks across the subset of unstructured entries to generate an aggregate padding mask for the data set;
aggregate the first token masks across the subset of unstructured entries to generate an aggregate first token mask for the data set;
determine inferred locations of fields of the unstructured entries of the data set based, at least in part, on the aggregate padding mask and the aggregate first token mask; and
indicate the inferred locations of fields of the unstructured entries of the data set.

15. The apparatus of claim 14, wherein the program code executable by the processor to cause the apparatus to determine inferred locations of fields of the unstructured entries of the data set comprises program code executable by the processor to cause the apparatus to determine where transitions occur between indications of different tokens using the aggregate padding mask and the aggregate first token mask.

16. The apparatus of claim 14, wherein the program code executable by the processor to cause the apparatus to create a first token mask that indicates inferred locations of fields within the unstructured entry based on a detected first non-padding token comprises program code executable by the processor to cause the apparatus to detect one or more non-padding tokens within the unstructured entry and indicating corresponding location or locations.

17. The apparatus of claim 16, wherein a non-padding token includes one or more of an alphabetic token, a numeric token, an alphanumeric token, and a symbolic token.

18. The apparatus of claim 17 further comprising program code executable by the processor to cause the apparatus to:
for each unstructured entry of at least a subset of unstructured entries of a data set, create a second token mask that indicates inferred locations of fields within the unstructured entry based on a detected second non-padding token, wherein the second non-padding token is different from the first non-padding token; and
aggregate the second token masks across the subset of unstructured entries to generate an aggregate second token mask for the data set.

19. The apparatus of claim 18, wherein the program code executable by the processor to cause the apparatus to determine inferred locations of fields of the unstructured entries of the data set comprises program code executable by the processor to cause the apparatus to determine where transitions occur between indications of a non-padding token and a different non-padding token using the aggregate first token mask and the aggregate second token mask.

20. The apparatus of claim 14, further comprising program code executable by the processor to cause the apparatus to determine whether the inferred locations of fields of rows of the data set remained consistent for a threshold number of rows of the data set.

* * * * *